United States Patent
Jiang et al.

(10) Patent No.: US 11,785,557 B2
(45) Date of Patent: Oct. 10, 2023

(54) RANDOM ACCESS POWER CONTROL METHOD AND APPARATUS AND COMMUNICATION SYSTEM

(71) Applicant: FUJITSU LIMITED, Kawasaki (JP)

(72) Inventors: Qinyan Jiang, Beijing (CN); Xin Wang, Beijing (CN); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/724,067

(22) Filed: Apr. 19, 2022

(65) Prior Publication Data

US 2022/0240197 A1 Jul. 28, 2022

Related U.S. Application Data

(63) Continuation of application No. 16/910,736, filed on Jun. 24, 2020, now Pat. No. 11,337,166, which is a
(Continued)

(51) Int. Cl.
*H04W 76/27* (2018.01)
*H04W 52/32* (2009.01)
(Continued)

(52) U.S. Cl.
CPC ......... *H04W 52/322* (2013.01); *H04W 52/10* (2013.01); *H04W 52/242* (2013.01);
(Continued)

(58) Field of Classification Search
CPC ............. H04W 52/322; H04W 52/242; H04W 56/001; H04W 76/27; H04W 74/0833; H04W 72/0473
See application file for complete search history.

(56) References Cited

U.S. PATENT DOCUMENTS 7,647,050 B2   1/2010   Dominique et al.
7,945,281 B1   5/2011   Sigg et al.
(Continued)

FOREIGN PATENT DOCUMENTS

AU   2012221962 B2   8/2012
CN   101911794 A    12/2010
(Continued)

OTHER PUBLICATIONS

Second Notification of Office Action issued by the China National Intellectual Property Administration for corresponding Chinese Patent Application No. 201780092671.7, dated Jul. 7, 2022, with an English translation.
(Continued)

*Primary Examiner* — Lakeram Jangbahadur
(74) *Attorney, Agent, or Firm* — Myers Wolin, LLC

(57) ABSTRACT

A random access power control apparatus and method and a communication system. The random access power control apparatus includes: a first calculating unit configured to, by using a pathloss estimated based on an synchronization signal/physical broadcast channel block and/or a channel state information reference signal (CSI-RS) currently selected by a UE, calculate transmission power used by the UE in transmitting random access preambles. Hence, the UE may be adapted to UE random access procedures in such complex scenarios as multiple beams.

6 Claims, 11 Drawing Sheets

Related U.S. Application Data continuation of application No. 16/450,273, filed on Jun. 24, 2019, now Pat. No. 10,736,054, which is a continuation of application No. PCT/CN2017/097220, filed on Aug. 11, 2017.

(51) Int. Cl.
| | | |
|---|---|---|
| *H04W 52/24* | (2009.01) | |
| *H04W 56/00* | (2009.01) | |
| *H04W 72/044* | (2023.01) | |
| *H04W 74/08* | (2009.01) | |
| *H04W 52/10* | (2009.01) | |

(52) U.S. Cl.
CPC ..... *H04W 56/001* (2013.01); *H04W 72/0473* (2013.01); *H04W 74/08* (2013.01); *H04W 74/0833* (2013.01); *H04W 76/27* (2018.02)

(56) References Cited

U.S. PATENT DOCUMENTS

| | | | |
|---|---|---|---|
| 8,718,667 | B2 | 5/2014 | Song et al. |
| 9,357,415 | B2 | 5/2016 | Amirijoo et al. |
| 2012/0008524 | A1 | 1/2012 | Amirijoo et al. |
| 2012/0302278 | A1 | 11/2012 | Baldemair et al. |
| 2013/0035084 | A1 | 2/2013 | Song et al. |
| 2014/0226638 | A1 | 8/2014 | Xu et al. |
| 2016/0234787 | A1 | 8/2016 | Liu |
| 2018/0287728 | A1* | 10/2018 | Ly .................. H04W 56/00 |
| 2018/0324022 | A1* | 11/2018 | Sheng ............. H04L 27/2692 |
| 2018/0324853 | A1* | 11/2018 | Jeon ............... H04W 74/006 |
| 2019/0173600 | A1 | 6/2019 | Cheng |

FOREIGN PATENT DOCUMENTS

| | | |
|---|---|---|
| CN | 102342145 A | 2/2012 |
| CN | 103782647 A | 5/2014 |
| CN | 104541554 A | 4/2015 |
| JP | 2014-506771 A | 3/2014 |
| WO | 2012/115445 A3 | 8/2012 |
| WO | 2015/012654 A1 | 1/2015 |

OTHER PUBLICATIONS

International Search Report issued by the State Intellectual Property Office of the P.R. China for corresponding International Patent Application No. PCT/CN2017/097220, dated Apr. 27, 2018, with an English translation.
Written Opinion of the International Searching Authority issued by the State Intellectual Property Office of the P.R. China for corresponding International Patent Application No. PCT/CN2017/097220, dated Apr. 27, 2018, with an English translation.
Non-Final Office Action issued by the United States Patent and Trademark Office for corresponding U.S. Appl. No. 16/450,273, dated Aug. 20, 2019.
Final Office Action issued by the United States Patent and Trademark Office for corresponding U.S. Appl. No. 16/450,273, dated Dec. 20, 2019.
Notice of Allowance issued by the United States Patent and Trademark Office for corresponding U.S. Appl. No. 16/450,273, dated Apr. 3, 2020.
Extended European search report with supplementary European search report and the European search opinion issued by the European Patent Office for corresponding European Patent Application No. 17921016.6-1205, dated Feb. 23, 2021.
RAN1, "LS on Beam Aspects of NR RACH", Work Item: NR_newRAT-Core, 3GPP TSG-RAN WG2 Meeting #99, R2-1707620, Berlin, Germany, Aug. 21-25, 2017; 3GPP TSG-RAN1 NR Ad-Hoc #2, R1-1711880, Qingdao, China, Jun. 27-30, 2017.
Notice of Reasons for Refusal issued by the Japan Patent Office for corresponding Japanese Patent Application No. 2020-506260, dated Mar. 2, 2021, with an English translation.
RAN WG 1, "LS on NR initial access and mobility", Work Item: NR_newRAT-Core, 3GPP TSG-RAN WG1 NR Ad-Hoc #2, R1-1712001, Qingdao, P.R China, Jun. 27-30, 2017.
Examination Report issued by the Patent Office of India for corresponding Indian Patent Application No. 202037004369, dated Mar. 12, 2021, with an English translation.
First Notification of Office Action and Search Report issued by the China National Intellectual Property Administration for corresponding Chinese Patent Application No. 201780092671.7, dated Mar. 7, 2022, with an English translation.
NTT DOCOMO, Inc., "Discussion on power ramping and power control during RA procedure for NR," Agenda Item: 5.1.1.4.3, 3GPP TSG RAN WG1 NR Ad-Hoc#2, R1-1711067, Qingdao, P.R. China, Jun. 27-30, 2017.
Non-Final Office Action issued by the United States Patent and Trademark Office for corresponding U.S. Appl. No. 16/910,736, dated Aug. 23, 2021.
Notice of Allowance issued by the United States Patent and Trademark Office for corresponding U.S. Appl. No. 16/910,736, dated Jan. 20, 2022.
Notice of Reasons for Refusal issued by the Japan Patent Office for corresponding Japanese Patent Application No. 2021-194086, dated Jan. 17, 2023, with an English translation.
NTT DOCOMO,Inc., "Discussion on NR RRM measurement based on SS block", Agenda Item: 5.1.1 5.1, 3GPP TSG-RAN WG1 NR Ad-Hoc Meeting #2, R1-1711069, Qingdao, P.R. China, Jun. 27-30, 2017.

* cited by examiner

RANDOM ACCESS POWER CONTROL METHOD AND APPARATUS AND COMMUNICATION SYSTEM

CROSS REFERENCE TO RELATED APPLICATIONS

This application is a continuation application of U.S. application Ser. No. 16/910,736 filed on Jun. 24, 2020, now pending, which is a continuation application of U.S. application Ser. No. 16/450,273 filed on Jun. 24, 2019, now U.S. patent Ser. No. 10/736,054 issued on Aug. 4, 2020, which is a continuation application of International Application PCT/CN2017/097220 filed on Aug. 11, 2017, the entire contents of each are incorporated herein by reference.

TECHNICAL FIELD

This disclosure relates to the field of communication technologies, and in particular to a random access power control method and apparatus and a communication system.

BACKGROUND

In a long term evolution (LTE) system, a user equipment (UE) performs an individual random access procedure attempt at a time, an initiates another random access procedure to again attempt to access when it is determined that this random access procedure attempt fails.

In a contention-based random access procedure, the UE randomly selects a preamble to transmit on a physical random access channel (PRACH). In non-contention-based random access procedure, a base station indicates the UE to use a preamble, and indicates the UE to use a specific PRACH time-frequency resource or indicates the UE to autonomously select a time-frequency resource.

It should be noted that the above description of the background is merely provided for clear and complete explanation of this disclosure and for easy understanding by those skilled in the art. It should not be understood that the above technical solution is known to those skilled in the art as it is described in the background of this disclosure.

SUMMARY

In the LTE, transmission power of a preamble may be calculated by using formula (1) below:

$$P_{PRACH} = \min\{P_{CMAX,c}(i), \text{PREAMBLE\_RECEIVED\_TARGET\_POWER} + PL_c\}[\text{dBm}] \quad (1);$$

where, $P_{CMAX,c}(i)$ is maximum transmission power of a UE to a subframe i in a cell c;

$PL_c$ is a downlink pathloss of the cell c estimated by the UE;

PREAMBLE_RECEIVED_TARGET_POWER is preamble receiving target power, which is expressed by formula (2) below:

$$\text{PREAMBLE\_RECEIVED\_TARGET\_POWER} = \text{preambleInitialReceivedTargetPower} + \text{DELTA\_PREAMBLE} + (\text{PREAMBLE\_TRANSMISSION\_COUNTER} - 1) * \text{powerRampingStep} \quad (2);$$

where, DELTA_PREAMBLE is a predefined power offset based on a preamble format, preambleInitialReceivedTargetPower and powerRampingStep are initial target receiving power and a power ramping step for the preamble configured by the cell, respectively, and PREAMBLE_TRANSMISSION_COUNTER is a preamble transmission counter value, an initial value of which being 1; if one time of random access attempt fails, 1 is added to the counter value in each time of restarting a time of random access attempt by the UE, and when a value to which 1 is added is greater than a maximum number of times of transmission configured by the cell, the UE reports a random access issue to a higher layer, and then the UE may perform cell reselection.

In the LTE, communication scenarios of random access are relatively simple, and in determining transmission power of a preamble, the number of considered factors is relatively few.

However, it was found by the inventors that in future wireless communication systems, such as a 5G system, and a new radio (NR) system, communication scenarios of random access become more complex, and uncertain factors possibly resulting in a failure of a random access procedure of a UE will be introduced. If an existing mechanism is still used to determine transmission power of a preamble, requirements of complex communication scenarios are hard to be satisfied. For example, in a scenario where a base station transmits multiple synchronization signals/physical broadcast channel blocks (SS/PBCH blocks), there exists a difference between pathlosses resulted from different SS/PBCH blocks. As the above difference is not taken into account in existing methods for determining transmission power of a preamble, it is hard to accurately estimate the transmission power of the preamble in multi-beam scenarios. And there currently exists no method for solving the above problem.

Hence, in consideration of complex communication scenario requirements of future wireless communication, embodiments of this disclosure provide a random access power control method and apparatus and a communication system, which are adapted to complex scenarios of random access of a UE.

According to a first aspect of the embodiments of this disclosure, there is provided a random access power control apparatus, including:

a first calculating unit configured to, by using a pathloss estimated based on an synchronization signal/physical broadcast channel block (SS/PBCH block) and/or a channel state information reference signal (CSI-RS) currently selected by UE, calculate transmission power used by the UE in transmitting random access preambles.

According to a second aspect of the embodiments of this disclosure, there is provided a random access power control method, including:

calculating transmission power used by UE in transmitting random access preambles by using a pathloss estimated based on an synchronization signal/physical broadcast channel block (SS/PBCH block) and/or a channel state information reference signal (CSI-RS) currently selected by the UE.

According to a third aspect of the embodiments of this disclosure, there is provided a random access power control apparatus, including:

a second calculating unit configured to calculate transmission power of a preamble by using a first parameter; wherein, the first parameter includes the number of sequences (N_seq.beam) received by an individual receiving beam of the UE, and/or a configuration parameter or subcarrier spacing adopted by the preamble, and/or a type of the UE, and/or gains of transmission/receiving beams of the UE.

According to a fourth aspect of the embodiments of this disclosure, there is provided a random access power control method, including:

calculating transmission power of a preamble by using a first parameter; wherein, the first parameter includes the number of sequences (N_seq.beam) received by an individual receiving beam of the UE, and/or a configuration parameter or subcarrier spacing adopted by the preamble, and/or a type of the UE, and/or gains of transmission/receiving beams of the UE.

According to a fifth aspect of the embodiments of this disclosure, there is provided a communication system, including a UE; the UE, by using a pathloss estimated based on an synchronization signal/physical broadcast channel block (SS/PBCH block) and/or a channel state information reference signal currently selected by the UE, calculates transmission power used by the UE in transmitting random access preambles, or the UE calculates transmission power of a preamble by using a first parameter.

An advantage of the embodiments of this disclosure exists in that in calculating the transmission power used by the UE in transmitting random access preambles, influences of multiple parameters are taken into account, which may be adapted for random access procedures of the UE in complex scenarios.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, blocks or components but does not preclude the presence or addition of one or more other features, integers, blocks, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals assign corresponding parts throughout the several views and may be used to assign like or similar parts in more than one embodiment.

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
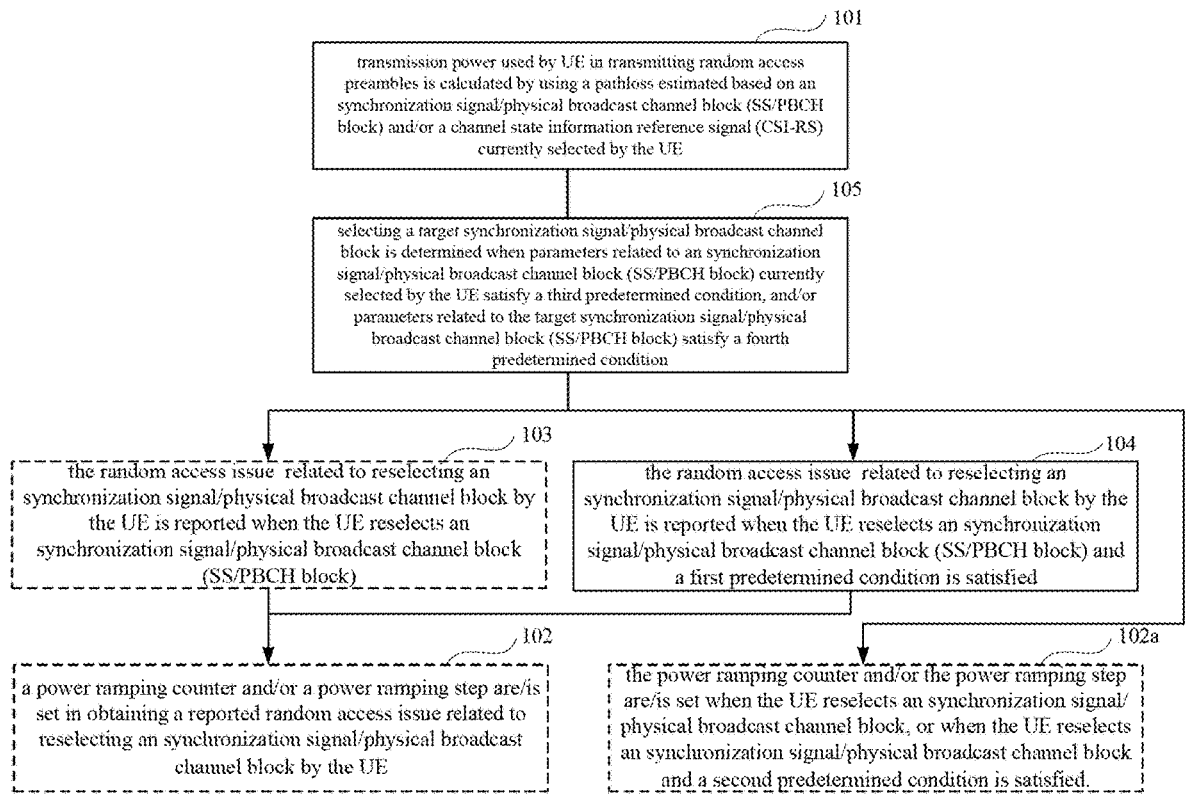
FIG. 1 is a flowchart of the random access power control method of Embodiment 1 of this disclosure.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various implementations of the embodiments of this disclosure shall be described with reference to the accompanying drawings. These implementations are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal device to the communication network and provides services for the terminal device. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

In the embodiments, the base station includes but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

In the embodiments, the user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiments of this disclosure, a random access procedure may be a contention-based random access procedure, or may be a non-contention-based random access procedure; according to whether a network device is able to uniquely identify a random access procedure of a certain piece of UE, a random access procedure is divided into a contention-based random access procedure and a non-contention-based random access procedure.

The embodiments of this disclosure shall be described below with reference to the accompanying drawings.

Embodiment 1

The embodiment provides a random access power control method, applicable to an apparatus side, such as a user equipment (UE) side, initiating a random access procedure to a network side.

FIG. 1 is a flowchart of the random access power control method of Embodiment 1 of this disclosure. As shown in FIG. 1, the method includes:

block 101: transmission power used by UE in transmitting random access preambles is calculated by using a pathloss estimated based on an synchronization signal/physical broadcast channel block (SS/PBCH block) and/or a channel state information reference signal (CSI-RS) currently selected by the UE.

According to the embodiment, the pathloss estimated based on the synchronization signal/physical broadcast channel block (SS/PBCH block) and/or the channel state information reference signal (CSI-RS) selected by the UE is taken into account in calculating the transmission power of the preambles, hence, it is adapted to UE random access procedures in such complex scenarios as multiple beams.

In the embodiment, a base station may periodically transmit multiple synchronization signals/physical broadcast channel blocks (SS/PBCH blocks), which may also be referred to as synchronization signal blocks (SSBs), in a manner of beam sweeping. The base station may configure a physical random access channel resource/preamble set (PRACH resource/preamble set), and divide it into multiple subsets, different SS/PBCH blocks being associated with different PRACH resource/preamble subsets. And the UE may select a cell and an SS/PBCH block in the cell, thereby determining a PRACH resource/preamble subset associated with the SS/PBCH block, select a PRACH resource and a preamble from the PRACH resource/preamble subset, and use the PRACH resource to transmit a message containing the preamble.

In the embodiment, in a case where a random access attempt fails, the UE may reselect an SS/PBCH block from the cell, so as to switch into a new PRACH resource/preamble subset for performing a random access attempt.

In an embodiment, as an SS/PBCH block selected by the UE may be changed, according to the pathloss estimated based on the SS/PBCH block selected by the UE, transmission power of a preamble corresponding to the SS/PBCH block may be accurately calculated, hence, it is adapted to UE random access procedures in such complex scenarios as multiple beams.

In an embodiment, the transmission power of the preamble may be calculated according to formula (3) below:

$$P_{PRACH} = \min\{P_{CMAX,c}, P_{PRACH,SSB}\}[\text{dBm}] \quad (3);$$

where, $P_{CMAX,c}$ is maximum transmission power of the UE in a cell c, and $P_{PRACH,SSB}$ is transmission power needed in transmitting the preamble calculated by the UE according to a power ramping counter and the pathloss estimated based on the SS/PBCH block; for example, $P_{PRACH,SSB}$ may be obtained according to formula (4) below:

$$P_{PRACH,SSB} = \text{PREAMBLE\_RECEIVED\_TARGET\_POWER} + PL1 \quad (4);$$

where, PL1 is the pathloss estimated based at least on the SS/PBCH block selected by the UE, and PREAMBLE_RECEIVED_TARGET_POWER denotes preamble receiving target power, which may be obtained based on the power ramping counter; for example, PREAMBLE_RECEIVED_TARGET_POWER may be obtained according to formula (5) below:

$$\text{PREAMBLE\_RECEIVED\_TARGET\_POWER} = \text{preambleInitialReceivedTargetPower} + \text{DELTA\_PREAMBLE} + (\text{POWER\_RAMPING\_COUNTER}-1)*\text{powerRampingStep} \quad (5);$$

where, preambleInitialReceivedTargetPower and power-RampingStep are initial target receiving power and a power ramping step for the preamble configured by the cell, respectively, DELTA_PREAMBLE is a predefined power offset based on a preamble format, and POWER_RAMP-ING_COUNTER denotes the power ramping counter.

In an embodiment, an initial value of the power ramping counter may be 1, and 1 may be added to the power ramping counter in each time of restarting random access attempt by the UE.

In an embodiment, each time of restarting a time of random access attempt by the UE may make 1 to be added to a preamble transmitting counter PREAMBLE_TRANS-MISSION_COUNTER.

In an embodiment, the power ramping counter POWER_RAMPING_COUNTER may be equal to or unequal to the preamble transmitting counter PREAMBLE_TRANSMISSION_COUNTER.

In an embodiment, when a value to which 1 is added to the preamble transmitting counter is greater than a maximum number of times of transmission configured by the cell, the UE may report a first random access issue to a higher layer, and then the UE may perform cell reselection.

In an embodiment, PL1 may be calculated based on particular implementation of the UE. For example, corresponding PL1 may be calculated based on a measurement value of receiving power (RSRP1) of the UE to which an SS/PBCH block currently selected by the UE corresponds. For example, the calculation may be performed according to formula (4-1) below:

$$PL1 = \text{transmission power of the base station} - \text{receiving power(RSRP1) of the UE} \quad (4\text{-}1).$$

In an embodiment, another possible case of the random access procedure of the UE is that for the UE in a CON-NECTED mode, the UE may be configured with channel state information reference signals (CSI-RSs) used for measurement, and different CSI-RSs may corresponding to different beams, so as to be associated with different physical random access channel (PRACH) resource/preamble sets, and the UE may, according to a measurement result based on the CSI-RSs, select PRACH resources corresponding to the CSI-RSs for performing random access.

In block 101 of an embodiment, the transmission power of the preamble may also be calculated by using a pathloss estimated based the CSI-RSs configured for the UE. For example, $P_{PRACH,SSB}$ may be calculated according to formula (4-2) below:

$$P_{PRACH,SSB} = \text{PREAMBLE\_RECEIVED\_TARGET\_POWER} + PL2 \quad (4\text{-}2);$$

where, PL2 is the pathloss estimated based on the CSI-RSs configured for the UE.

In block 101 of an embodiment, in calculating the transmission power of the preamble, either one of PL1 and PL2 may be used, or PL1 and PL2 are used to form PL3, and PL1 in formula (4) is replaced with PL3.

In an embodiment, as shown in FIG. 1, the method further includes:

block 102: a power ramping counter and/or a power ramping step are/is set in obtaining a reported random access issue related to reselecting an synchronization signal/physical broadcast channel block by the UE.

In an embodiment, in obtaining the reported random access issue (i.e. a second random access issue) related to reselecting an synchronization signal/physical broadcast channel block by the UE, the transmission power of the UE for transmitting the preamble may be controlled by setting the power ramping counter and/or the power ramping step, thereby avoiding influence of over high power to other UE in transmitting the preamble to which the reselected synchronization signal/physical broadcast channel block corresponds.

In an embodiment, the power ramping counter and/or the power ramping step may be set by a higher layer of the UE. For example, the power ramping counter and/or the power ramping step may be reset to be of a predetermined value; for example, the power ramping counter is set to be 0 or to be halved.

In an embodiment, in a case where the power ramping counter and/or the power ramping step are(is) set in block 102, the UE may calculate the transmission power of the preamble according to the newly-set power ramping counter and/or power ramping step in a subsequent random access attempt, hence, the transmission power of the preamble may be controlled.

In an embodiment, as shown in FIG. 1, the method further includes:

block 103: the random access issue related to reselecting an synchronization signal/physical broadcast channel block by the UE is reported when the UE reselects an synchronization signal/physical broadcast channel block (SS/PBCH block).

In an embodiment, as shown in FIG. 1, the method further includes:

block 104: the random access issue related to reselecting an synchronization signal/physical broadcast channel block by the UE is reported when the UE reselects an synchronization signal/physical broadcast channel block (SS/PBCH block) and a first predetermined condition is satisfied.

In an embodiment, the first predetermined condition concerned in block 104 may be at least one of the following conditions: the power ramping counter is greater than a first threshold (N_thre); and transmission power calculated by the UE by using a pathloss estimated based on the synchronization signal/physical broadcast channel block (SS/PBCH block) reselected by the UE is greater than a second threshold (P_thre).

In blocks 103 and 104 of an embodiment, the random access issue (i.e. the second random access issue) related to reselecting an synchronization signal/physical broadcast channel block by the UE may be reported to the higher layer of the UE, and after receiving the second random access issue, the higher layer of the UE sets the power ramping counter and/or the power ramping step.

In an embodiment, as shown in FIG. 1, the method further includes:

block 102a: the power ramping counter and/or the power ramping step are/is set when the UE reselects an synchronization signal/physical broadcast channel block, or when the UE reselects an synchronization signal/physical broadcast channel block and a second predetermined condition is satisfied.

In block 102a of an embodiment, the power ramping counter and/or the power ramping step may be set without needing to report the second random access issue. For example, when the unit for setting the power ramping counter and/or the power ramping step and the unit for counting are located at the same layer of the UE, the power ramping counter and/or the power ramping step may be set without needing to report the second random access issue.

In an embodiment, the second predetermined condition may be at least one of conditions listed in the first predetermined condition.

In an embodiment, as shown in FIG. 1, the method further includes:

block 105: selecting a target synchronization signal/physical broadcast channel block is determined when parameters related to an synchronization signal/physical broadcast channel block (SS/PBCH block) currently selected by the UE satisfy a third predetermined condition, and/or parameters related to the target synchronization signal/physical broadcast channel block (SS/PBCH block) satisfy a fourth predetermined condition.

Hence, when the UE determines to restart a random access attempt, it may determine whether to reselect an synchronization signal/physical broadcast channel block (SS/PBCH block), which may avoid selecting SS/PBCH blocks too frequently, and avoid ping-ponging effects between the SS/PBCH blocks.

In an embodiment, the third predetermined condition may be any one of the following conditions or a combination thereof:

(1) receiving power of the currently selected synchronization signal/physical broadcast channel block is less than a third threshold; for example, the UE may compare the receiving power RSRP of the currently selected SS/PBCH block with a third threshold X [dBm], and may reselect an SS/PBCH block if RSRP<X [dBm], otherwise, the UE may not reselect a new SS/PBCH block;

(2) a difference between transmission power $P_{PRACH,SSB}$ of a preamble calculated based on the currently selected synchronization signal/physical broadcast channel block and maximum transmission power $P_{CMAX,c}$ of the UE in a cell is greater than a fourth threshold Z [dB];

for example, when $(P_{PRACH,SSB}-P_{CMAX,c})$>Z [dB], the UE may reselect an SS/PBCH block, otherwise, the UE does not reselect a new SS/PBCH block;

(3) the number of times of transmitting at the maximum transmission power of the preamble calculated based on the currently selected synchronization signal/physical broadcast channel block is greater than or equal to a fifth threshold N;

for example, the maximum transmission power of the preamble calculated based on the currently selected SS/PBCH block is $P_{max}$, and when the number of times of transmitting the preamble by the UE by using the maximum transmission power $P_{max}$ is greater than or each to N, the UE may reselect an SS/PBCH block in retransmitting a preamble next time, otherwise, the UE does not reselect a new SS/PBCH block;

(4) a time of attempting random access based on the currently selected synchronization signal/physical broadcast channel block is greater than or equal to a sixth threshold T [ms];

for example, if the time of attempting random access by the UE based on the currently selected SS/PBCH block is greater than or equal to the sixth threshold T [ms], it may reselect an SS/PBCH block, otherwise, the UE does not reselect a SS/PBCH block.

In an embodiment, the fourth predetermined condition may include at least one of the following conditions:

(1) a difference between receiving power of the target synchronization signal/physical broadcast channel block and the receiving power of the currently selected synchronization signal/physical broadcast channel block is greater than or equal to a seventh threshold;

for example, the UE may compare the difference between receiving power RSRP2 of the target SS/PBCH block and the receiving power RSRP1 of the currently selected SS/PBCH block (RSRP2-RSRP1) with the seventh threshold Y [dB], and select the target SS/PBCH block as a new SS/PBCH block if (RSRP2-RSRP1)≥Y [dB], otherwise, the UE does not reselect a new SS/PBCH block;

(2) a difference between the maximum transmission power $P_{CMAX,c}$ of the UE in a cell and transmission power $P_{\_SSB}$ of the preamble calculated based on the target synchronization signal/physical broadcast channel block is greater than an eighth threshold W [dB];

for example, when $P_{CMAX,c}-P_{\_SSB}$->W dB, the UE may select the target SS/PBCH block as a new SS/PBCH block, otherwise, the UE does not reselect a new SS/PBCH block.

In an embodiment, the first threshold, and/or the second threshold, and/or the third threshold, and/or the fourth threshold, and/or the fifth threshold, and/or the sixth threshold, and/or the seventh threshold, and/or the eighth threshold, may be configured by the base station for the UE. For example, the base station may configure via a system message, and/or RRC signaling, and/or physical layer control signaling. And furthermore, an embodiment is not limited thereto; for example, the UE may also configure any one or two or more of the first threshold to the eighth threshold.

Figure 2:
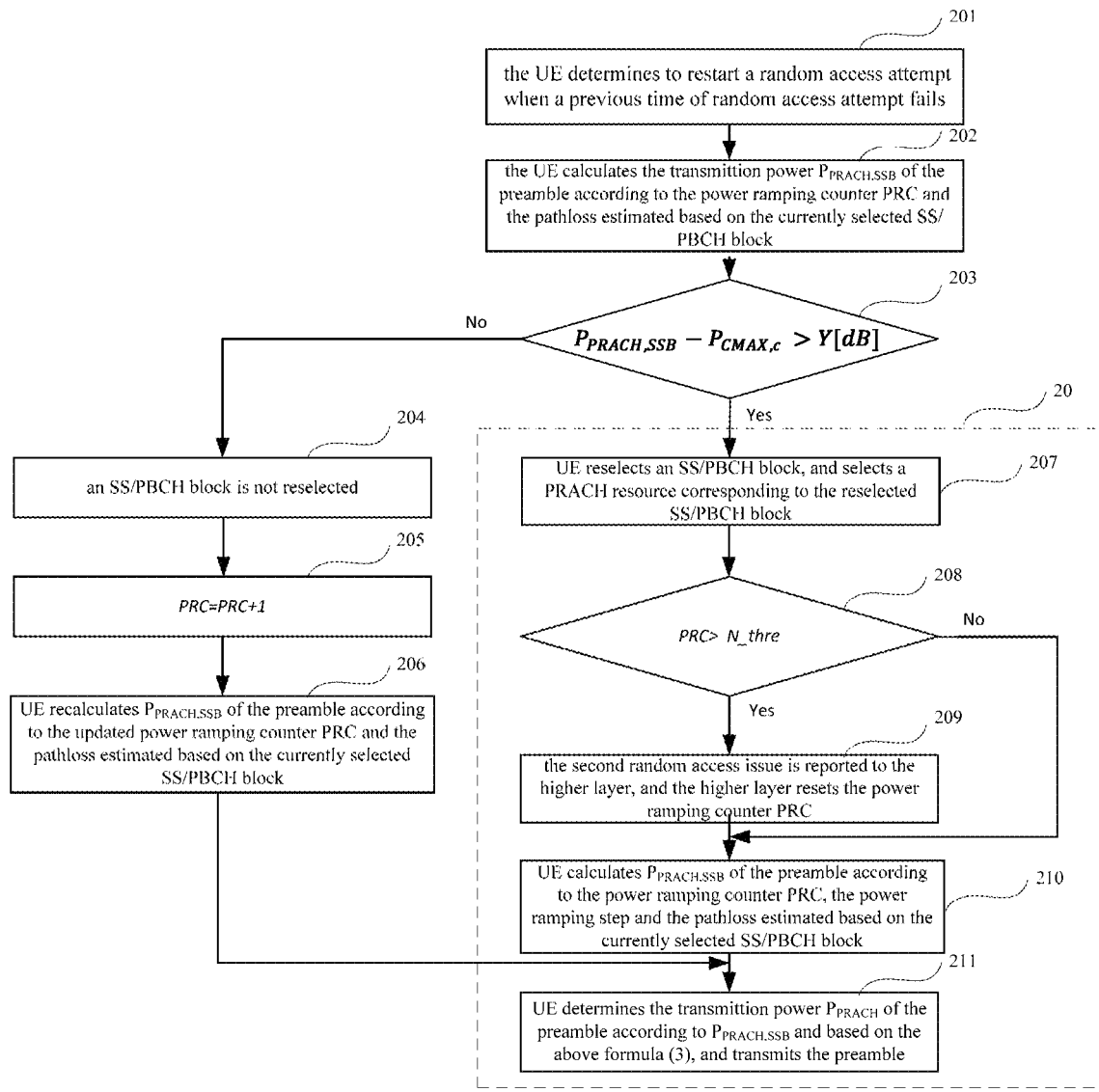
FIG. 2 is a schematic diagram of performing random access attempt by the UE in Embodiment 1 of this disclosure.

A method for performing random access attempt by the UE of an embodiment shall be described below with reference to an example. FIG. 2 is a flowchart of the method for performing random access attempt by the UE of an embodiment. As shown in FIG. 2, the method includes:

block 201: the UE determines to restart a random access attempt when a previous time of random access attempt fails;

block 202: the UE calculates the transmission power $P_{PRACH,SSB}$ of the preamble according to the power ramping counter PRC and the pathloss estimated based on the currently selected SS/PBCH block;

block 203: it is determined whether $P_{PRACH,SSB}-P_{CMAX,c}$ is greater than the threshold Z [dB], entering into block 204 when it is no, and entering into block 207 when it is yes;

block 204: an SS/PBCH block is not reselected;

block 205: 1 is added to the power ramping counter PRC to update the PRC;

block 206: the UE recalculates the transmission power $P_{PRACH,SSB}$ of the preamble according to the updated power ramping counter PRC and the pathloss estimated based on the currently selected SS/PBCH block;

block 207: the UE reselects an SS/PBCH block, and selects a PRACH resource corresponding to the reselected SS/PBCH block;

block 208: it is determined whether the power ramping counter PRC is greater than the first threshold N_thre, entering into block 210 when it is no, and entering into block 209 when it is yes;

block 209: the second random access issue is reported to the higher layer, and the higher layer resets the power ramping counter PRC, such as setting the power ramping counter PRC to be half of the original value, or resetting the power ramping step by the higher layer, such as setting the power ramping step to be half of the original value;

block 210: the UE recalculates the transmission power $P_{PRACH,SSB}$ of the preamble according to the power ramping counter PRC, the power ramping step and the pathloss estimated based on the currently selected SS/PBCH block; and block 211: the UE determines the transmission power $P_{PRACH}$ of the preamble according to $P_{PRACH,SSB}$ and based on the above formula (3), and transmitting the preamble.

In FIG. 2, a block shown by a dotted-line frame 20 denotes a processing of reporting the second random access issue to the higher layer by the UE after selecting a new SS/PBCH block.

According to the embodiment, the pathloss estimated based on the synchronization signal/physical broadcast channel block (SS/PBCH block) selected by the UE is taken into account in calculating the transmission power of the preamble, which is adapted for random access procedures of the UE in such complex scenarios as multiple beams. In the case where the UE selects a new SS/PBCH block, the power ramping counter PRC and the power ramping step are set, thereby controlling the transmission power of the preamble, and avoiding influence to other UE. And the UE will select a new SS/PBCH block to transmit the preamble only when the predetermined condition is satisfied, thereby avoiding ping-ponging effects between the SS/PBCH blocks.

Embodiment 2

The embodiment provides a random access power control method, applicable to an apparatus side, such as a user equipment (UE) side, initiating a random access procedure to a network side.

Figure 3:
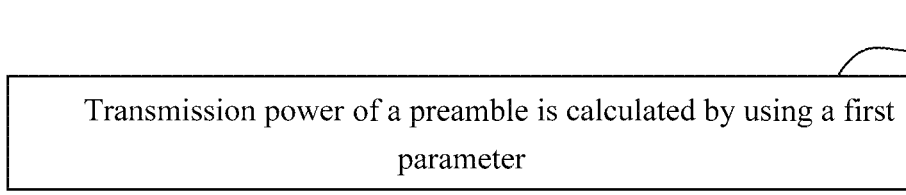
FIG. 3 is a flowchart of the random access power control method of Embodiment 2 of this disclosure.

FIG. 3 is a flowchart of the random access power control method of Embodiment 2 of this disclosure. As shown in FIG. 3, the method includes:

block 301: transmission power of a preamble is calculated by using a first parameter.

In an embodiment, the first parameter may include, for example, the number of sequences (N_seq.beam) received by an individual receiving beam of the UE, and/or a configuration parameter or subcarrier spacing (numerology/SCS) adopted by the preamble, and/or a type of the UE, and/or gains of transmission/receiving beams (TX/RX beams) of the UE.

Furthermore, in an embodiment, the first parameter may not be limited to the above listed parameters.

According to an embodiment, the first parameter is taken into account in calculating the transmission power of the preamble, such that the transmission power of the preamble is able to satisfy requirements of complex communication scenarios.

In an embodiment, the transmission power $P'_{PRACH}$ of the preamble may be determined according to formula (6) below:

$$P_{PRACH} = \min\{P_{CMAX,c}, P'_{PRACH,SSB}\} \text{[dBm]} \quad (6);$$

where, $P_{CMAX,c}$ is maximum transmission power of the UE in a cell c, and $P_{PRACH,SSB}$ is transmission power needed in transmitting the preamble calculated by the UE according to a power ramping counter and an estimated value of a pathloss; for example, the first parameter may be used for determining a power offset, and the power offset may be brought into the formula for calculating $P'_{PRACH}$.

In one implementation, $P'_{PRACH}$ may be calculated according to the power offset DELTA_P set by the first parameter, the estimated value of the pathloss and a preamble receiving target power (PREAMBLE_RECEIVED_TARGET_POWER) obtained based on the power ramping counter. For example, $P'_{PRACH}$ may be obtained according to formula (7) below:

$$P'_{PRACH,SSB} = \text{PREAMBLE\_RECEIVED\_TARGET\_POWER} + PL' + \text{DELTA\_}P \quad (7);$$

where, PL' is the estimated value of the pathloss of the path transmitting the preamble, which may be a downlink pathloss of the cell c estimated by the UE. Hence, PL' may be equal to PLc in formula (1). Furthermore, the estimated value of the pathloss may also be a pathloss estimated based on the SS/PBCH block selected by the UE. Hence, PL' may be equal to PL1 in formula (4), or PL2 or PL3 in formula (4-2), and in a case where PL' may be equal to PL1, or PL2, or PL3 in formula (4), the random access method of an embodiment may be merged with the random access method of Embodiment 1, that is, block 301 in FIG. 3 may be combined with block 101 in FIG. 1. Hence, the transmission power of the preamble is calculated according to the power ramping counter POWER_RAMPING_COUNTER, the pathloss estimated based on the synchronization signal/physical broadcast channel block (SS/PBCH block) selected by the UE and/or a channel state information reference signal (CSI-RS) and the first parameter; and PREAMBLE_RECEIVED_TARGET_POWER denotes the preamble receiving target power, and may be obtained based on the power ramping counter. For example, PREAMBLE_RECEIVED_TARGET_POWER may be obtained according to formula (5) above.

In another implementation, $P'_{PRACH,SSB}$ may be calculated according to the preamble receiving target power obtained based on the power offset DELTA_P set by the first parameter and the power ramping counter and the pathloss PL'. For example, $P'_{PRACH,SSB}$ may be obtained according to formula (8) below:

$$P'_{PRACH,SSB} = \text{PREAMBLE\_RECEIVED\_TARGET\_POWER}' + PL' \quad (8);$$

where, PREAMBLE_RECEIVED_TARGET_POWER' is the preamble receiving target power obtained based on the power offset DELTA_P set by the first parameter and the power ramping counter; for example, PREAMBLE_RECEIVED_TARGET_POWER' may be obtained by using formula (9) below:

$$\begin{aligned}\text{PREAMBLE\_RECEIVED\_TARGET\_POWER}' = \\ \text{preambleInitialReceivedTargetPower} + \text{DEL-}\\ \text{TA\_PREAMBLE} + \text{DELTA\_}P + \\ (\text{POWER\_RAMPING\_COUNTER} - 1)^* \text{power-}\\ \text{RampingStep}\end{aligned} \quad (9);$$

where, preambleInitialReceivedTargetPower and powerRampingStep are initial target receiving power and a power ramping step for the preamble configured by the cell, respectively, DELTA_PREAMBLE is a predefined power offset based on a preamble format, POWER_RAMPING_COUNTER denotes the power ramping counter, and DELTA_P is the power offset according to a feature parameter.

In the above formulae (7) and (9), the power offset DELTA_P is introduced into the calculation of $P'_{PRACH,SSB}$ in a form of addition operation. However, the embodiment is not limited thereto, and the power offset DELTA_P may also be introduced into the calculation of $P'_{PRACH,SSB}$ in a form of subtraction operation, and/or multiplication operation, and/or division operation, and/or exponential operation, and/or logarithmic operation, etc. Furthermore, the power offset DELTA_P may also be introduced into formulae (7) and (9) under some predetermined conditions, so as to calculate $P'_{PRACH,SSB}$. For example, in a case where the preamble is a short sequence, for formula (9), DELTA_P may be reserved and DELTA_PREAMBLE may be deleted, that is, DELTA_PREAMBLE is replaced with DELTA_P. Moreover, in a case where the preamble is a long sequence, for formula (9), DELTA_PREAMBLE may be reserved and DELTA_P may be deleted.

A method of determination of DELTA_PREAMBLE in formulae (5) and (9) shall be described below.

DELTA_PREAMBLE may be determined according to the preamble format.

In an embodiment, for a preamble of a long sequence (a sequence length L is 839), values of DELTA_PREAMBLE to which other formats correspond may be determined by taking format 0 (839) as a reference format; for a preamble of a short sequence (a sequence length L is 127/139, i.e. 127 or 139), values of DELTA_PREAMBLE to which other formats correspond may be determined by taking a format (such as format A0) in the short sequence (127/139) as a reference format; and a value of DELTA_PREAMBLE to which the reference format of the short sequence corresponds may be obtained by taking a value of DELTA_PREAMBLE to which the reference format of the long sequence corresponds as a reference. Table 1 shows values of DELTA_PREAMBLE to which the formats correspond.

TABLE 1

| Preamble Format | DELTA_PREAMBLE |
|---|---|
| 0 | 0 dB |
| 1 | −3 dB |
| 2 | −6 dB |
| 3 | 6 dB |
| Short sequence formats | 14 dB (assuming that a reference format is A0, and Δf = 15 kHz) |

In Table 1, for formats 0, 1, 2, 3 to which the long sequence corresponds, corresponding DELTA_PREAMBLE may be determined directly from Table 1; wherein, values of DELTA_PREAMBLE to which formats 1, 2, 3 corresponds are obtained by taking a value of DELTA_PREAMBLE to which format 0 corresponds as a reference. For the formats to which the short sequence corresponds, values of DELTA_PREAMBLE to which the short sequence reference formats correspond may be taken as the values of DELTA_PREAMBLE to which the formats correspond. And the values of DELTA_PREAMBLE to which the short sequence reference formats correspond are, for example, 14 dB, and such a numeral value may be a value obtained by taking a value of 0 of DELTA_PREAMBLE to which format 0 corresponds as a reference.

Furthermore, in Table 1, Δf=15 kHz denotes a bandwidth of a subcarrier adopted by the preamble.

Moreover, Table 1 is illustrative only, and the values of DELTA_PREAMBLE to which the formats correspond may also be other values.

Method for calculating P'PRACH,SSB according to feature parameters shall be described below.

1. Calculating P'PRACH,SSB According to the Number of Sequences (N_Seq.Beam) Received by an Individual Receiving Beam of the UE The power offset determined according to N_seq.beam is DELTA_P=DELTA_NoS.

In an embodiment, DELTA_NoS to which the formats of the preamble of a long sequence (a sequence length L is 839) correspond and the formats of the preamble of a short sequence (a sequence length L is 127/139) correspond are different. Table 2 is a list of DELTA_NoS to which the preamble of a long sequence corresponds.

TABLE 2

| Format | L | DELTA_NoS |
|---|---|---|
| 0 | 839 | 0 dB |
| 1 | 839 | 0 dB |
| 2 | 839 | 0 dB |
| 3 | 839 | 0 dB |

Table 3 is a list of DELTA_NoS to which the preamble of a short sequence corresponds. For example, if format A0 is taken as a reference format to calculate DELTA_NoS to which the short sequence formats correspond, DELTA_NoS may be determined according to formula (10) below:

$$\text{DELTA\_NoS} = \lceil -10 \log(N\_\text{seq.beam}) \rceil \quad (10).$$

TABLE 3

L = 127/139

| Format | # of Sequence | N_seq. beam | DELTA_NoS |
|---|---|---|---|
| A0 (short sequence reference format) | 1 | 1 | 0 dB |
| A1 | 2 | 1 | 0 dB |
|  |  | 2 | −3 dB |
| A2 | 4 | 1 | 0 dB |
|  |  | 2 | −3 dB |
|  |  | 4 | −6 dB |
| A3 | 6 | 1 | 0 dB |
|  |  | 2 | −3 dB |
|  |  | 3 | −4 dB |
|  |  | 6 | −7 dB |
| B0 | 1 | 1 | 0 dB |
| B1 | 2 | 1 | 0 dB |
|  |  | 2 | −3 dB |
| B2 | 4 | 1 | 0 dB |
|  |  | 2 | −3 dB |
|  |  | 4 | −6 dB |
| B3 | 6 | 1 | 0 dB |
|  |  | 2 | −3 dB |
|  |  | 3 | −4 dB |
|  |  | 6 | −7 dB |
| B4 | 12 | 1 | 0 dB |
|  |  | 2 | −3 dB |
|  |  | 3 | −4 dB |
|  |  | 4 | −6 dB |
|  |  | 6 | −7 dB |
|  |  | 12 | −10 dB |
| C0 | 1 | 1 | 0 dB |
| C1 | 2 | 1 | 0 dB |
|  |  | 2 | −3 dB |

In Table 1 and Table 2, the format refers to a preamble format, "# of sequence" denotes an index of a received sequence.

For a long sequence preamble or a short sequence preamble, according to its N_seq.beam, DELTA_NoS shown in Table 2 or Table 3 may be substituted into formula (7), or (8) or (9), so as to obtain P'$_{PRACH,SSB}$ through calculation.

Furthermore, in an embodiment, DELTA_NoS may be introduced into formula (7) or (9) under some predetermined conditions, so as to obtain P'$_{PRACH,SSB}$ through calculation. For example, in a case where the preamble is a short sequence (127/139), DELTA_NoS may be reserved and DELTA_PREAMBLE may be deleted in formula (7) or (9), that is, an effect of DELTA_PREAMBLE on the transmission power of the preamble is taken into account only when the preamble is a short sequence (127/139), and DELTA_PREAMBLE is replaced with DELTA_NoS. Furthermore, in a case where the preamble is a long sequence (839), DELTA_PREAMBLE may be reserved and DELTA_NoS may be deleted in formula (7) or (9); for example, formula (9) may be written into the following form (9a):

PREAMBLE_RECEIVED_TARGET_POWER'=
preambleInitialReceivedTargetPower+DELTA_PREAMBLE(for 839)/DELTA_NoS(for 127/139)+(POWER_RAMPING_COUNTER−1)
*powerRampingStep    (9a);

where, DELTA_PREAMBLE(for 839)/DELTA_NoS(for 127/139) denotes that in the case where the preamble is a short sequence (127/139), values of DELTA_NoS are taken, for example, the values of DELTA_NoS may be determined with reference Table 3 above, and in the case where the preamble is a long sequence (839), values of DELTA_PREAMBLE are taken, for example, the values of DELTA_PREAMBLE may be determined with reference Table 1 above.

2. Calculating P'$_{PRACH,SSB}$ According to the Configuration Parameter or Subcarrier Spacing (Numerology/SCS) Adopted by the Preamble In an embodiment, for the case of short sequence preamble, the transmission power of the preamble may be calculated based on the configuration parameter or subcarrier spacing adopted by the preamble.

The power offset determined based on the configuration parameter or subcarrier spacing (numerology/SCS) adopted by the preamble may be expressed as DELTA_P=DELTA_SCS; for example, DELTA_SCS may be determined according to (11) below:

$$\text{DELTA SCS} = 10 \log(\mu+1) \quad (11);$$

where, $\mu$ denotes the configuration parameter of the subcarrier spacing adopted by the preamble, and the subcarrier spacing $\Delta f$ adopted by the preamble may be expressed as $\Delta f = 15 \cdot 2^\mu$ kHz, a value of $\mu$ being, for example, 0, or 1, or 2, or 3, etc.

For example, transmission power needed by a preamble with an SCS being 15 kHz is taken as reference transmission power, and $\Delta f = 15 \cdot 2^\mu$ kHz denotes the subcarrier spacing adopted by the preamble. Taking format A2 as an example, the power offset DELTA_SCS relative to the reference transmission power may be as shown in Table 4 below.

TABLE 4

| Format | # of Sequence | SCS/$\mu \in \{0, 1, 2, 3\}$ ($\Delta f = 15 \cdot 2^\mu$ kHz) | DELTA_SCS |
|---|---|---|---|
| A2 | 4 | 15 kHz/0 | 0 |
|    |   | 30 kHz/1 | 3 dB |
|    |   | 60 kHz/2 | 6 dB |
|    |   | 120 kHz/3 | 9 dB |

3. Calculating P'$_{PRACH,SSB}$ According to the Type of the UE

In an embodiment, the type of the UE may refer to, for example, a type of service of the UE, and the power offset determined based on the type of the UE may be denoted as DELTA_P=DELTA_UE.

In an embodiment, a list of correspondence between a type of the UE and values of DELTA_P=DELTA_UE, hence, a value of DELTA_P=DELTA_UE to which a type of the UE corresponds may be determined.

Table 5 below shows an example of correspondence between a type of the UE and values of DELTA_P=DELTA_UE.

TABLE 5

| Type of UE | Value of DELTA_UE |
|---|---|
| 0 (with beam correspondence) | 0 dB |
| 1 (without beam correspondence) | 3 dB |

In the above table, a type 0 of the UE denotes that a type of the UE is able to perform beam correspondence, and a value of DELTA_P=DELTA_UE to which the type corresponds is 0 dB, and a type 1 of the UE denotes that a type of the UE is unable to perform beam correspondence, and a value of DELTA_P=DELTA_UE to which the type corresponds is 3 dB.

4. Calculating P'$_{PRACH,SSB}$ According to Gains of Transmission/Receiving Beams of the UE In an embodiment, the power offset determined according to the gains of transmission/receiving beams of the UE may be expressed as DELTA_P=DELTA Beam.

In an embodiment, values of DELTA_P=DELTA Beam to which the gains of transmission/receiving beams of the UE correspond may be determined by a predetermined list of correspondence between gains of transmission/receiving beams of the UE and values of DELTA_P=DELTA Beam or a formula.

In an embodiment, P'$_{PRACH,SSB}$ may be calculated by taking at least one of DELTA_NoS, DELTA_SCS, DELTA_UE and DELTA Beam, or a combination of two or more thereof, as DELTA_P.

In an embodiment, the UE may, in a manner identical to that in Embodiment 1, determine whether to reselect an SS/PBCH block to transmit the preamble, and in a case where the UE reselects an SS/PBCH block, the UE may, in the manner of Embodiment 1, determine an occasion of reporting the second random access issue by the UE, and manners of the higher layer of the UE for resetting a power ramping counter and/or a power ramping step are identical to those in Embodiment 1.

5. Calculating P'PRACH,SSB According to the Number of Sequences and the Number of Receiving Beams Contained in the Preamble Particulars are similar to those in 1.

According to an embodiment, in calculating the transmission power of the preamble, the first parameter is taken into account, hence, the transmission power of the preamble is enabled to satisfy requirements of complex communication scenarios.

Embodiment 3

Embodiment 3 provides a random access power control apparatus. As a principle of the apparatus for solving problems is similar to those of the methods in embodiments 1 and 2, the implementations of the methods in embodiments 1 and 2 may be referred to for implementation of the apparatus, with identical contents being not going be described herein any further.

Figure 4:
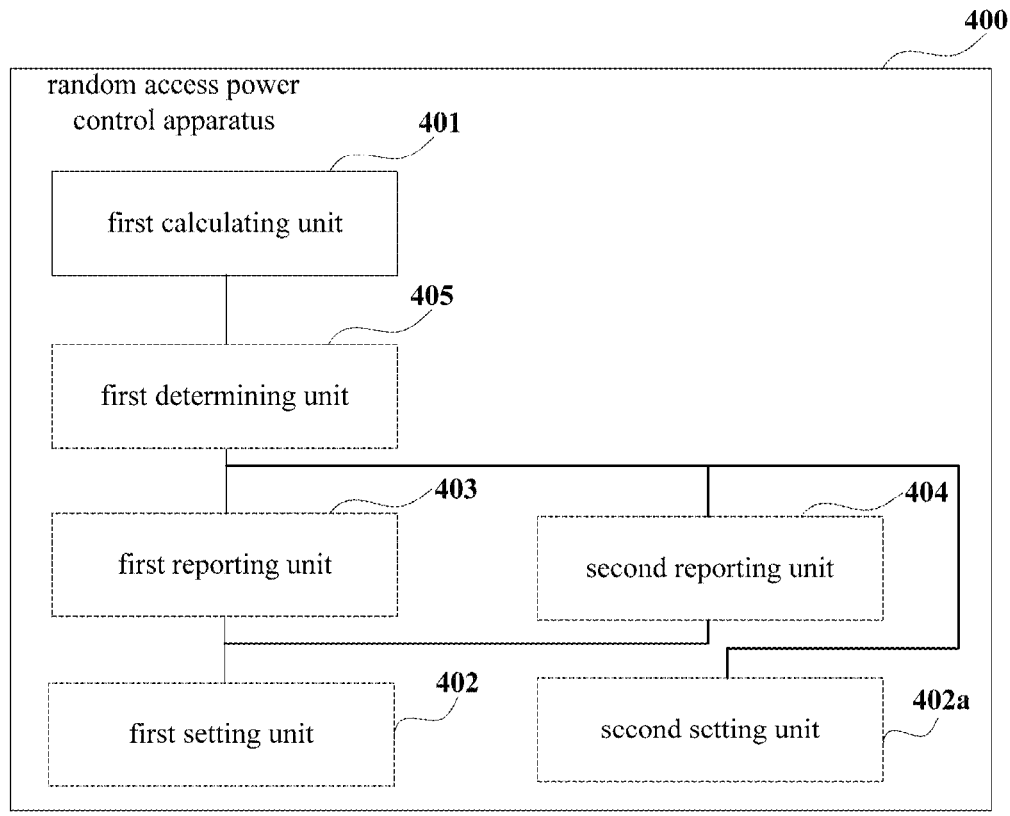
FIG. 4 is a schematic diagram of the random access power control apparatus of Embodiment 3 of this disclosure.

FIG. 4 is a schematic diagram of the random access power control apparatus. As shown in FIG. 4, a random access power control apparatus 400 includes a first calculating unit 401 configured to calculate transmission power used by the UE in transmitting random access preambles.

In an embodiment, by using a pathloss estimated based on an synchronization signal/physical broadcast channel block (SS/PBCH block) and/or a channel state information reference signal currently selected by UE, the first calculating unit 401 calculates the transmission power used by the UE in transmitting random access preambles.

In an embodiment, as shown in FIG. 4, the apparatus 400 may further include a first setting unit 402 configured to set a power ramping counter and/or a power ramping step in obtaining a reported random access issue related to reselecting an synchronization signal/physical broadcast channel block by the UE.

In an embodiment, the first setting unit 402 may be achieved by a higher layer of the UE, the higher layer of the UE being, for example, a media access control (MAC) layer.

In an embodiment, as shown in FIG. 4, the apparatus 400 may further include a first reporting unit 403 configured to report the random access issue related to reselecting an synchronization signal/physical broadcast channel block by the UE to the setting unit 402 when the UE reselects an synchronization signal/physical broadcast channel block (SS/PBCH block).

In an embodiment, as shown in FIG. 4, the apparatus 400 may further include a second reporting unit 404 configured to report the random access issue related to reselecting an synchronization signal/physical broadcast channel block by the UE to the setting unit 402 when the UE reselects an synchronization signal/physical broadcast channel block and a first predetermined condition is satisfied.

In an embodiment, the first predetermined condition is at least one of the following conditions:

the power ramping counter is greater than a first threshold; and transmission power calculated by the UE by using a pathloss estimated based on the synchronization signal/physical broadcast channel block reselected by the UE is greater than a second threshold.

In an embodiment, as shown in FIG. 4, the apparatus 400 may further include a second setting unit 402a configured to set the power ramping counter and/or the power ramping step when the UE reselects an synchronization signal/physical broadcast channel block, or when the UE reselects an synchronization signal/physical broadcast channel block and a second predetermined condition is satisfied.

In an embodiment, the second setting unit 402a may set the power ramping counter and/or the power ramping step without needing to report the random access issue related to reselecting an synchronization signal/physical broadcast channel block by the UE (i.e. the second random access issue) to the second setting unit 402a; wherein, the second setting unit 402a, for example, may be located in a physical layer of the UE.

In an embodiment, the second predetermined condition may be at least one of conditions listed in the first predetermined condition.

In an embodiment, as shown in FIG. 4, the apparatus 400 may further include a first determining unit 405 configured to determine to select a target synchronization signal/a physical broadcast channel block when parameters related to an synchronization signal/physical broadcast channel block (SS/PBCH block) currently selected by the UE satisfy a third predetermined condition, and/or parameters related to the target synchronization signal/physical broadcast channel block (SS/PBCH block) satisfy a fourth predetermined condition.

In an embodiment, the third predetermined condition includes at least one of the following conditions:

receiving power of the currently selected synchronization signal/physical broadcast channel block is less than a third threshold;

a difference between transmission power of a preamble calculated based on the currently selected synchronization signal/physical broadcast channel block and maximum transmission power of the UE in a cell is greater than a fourth threshold;

the number of times of transmitting at the maximum transmission power of the preamble calculated based on the currently selected synchronization signal/physical broadcast channel block is greater than or equal to a fifth threshold; and a time of attempting random access based on the currently selected synchronization signal/physical broadcast channel block is greater than or equal to a sixth threshold.

In an embodiment, the fourth predetermined condition includes at least one of the following conditions:

a difference between receiving power of the target synchronization signal/physical broadcast channel block and the receiving power of the currently selected synchronization signal/physical broadcast channel block is greater than or equal to a seventh threshold; and a difference between the maximum transmission power of the UE in a cell and transmission power of the preamble calculated based on the target synchronization signal/physical broadcast channel block is greater than an eighth threshold.

In an embodiment, in calculating the transmission power, the first calculating unit 401 may calculate the transmission power according to feature parameters related to the UE, that is, the first calculating unit 401 may calculate the transmission power used by the UE in transmitting the preamble in the random access procedure according to the power ramping counter, the pathloss estimated based on the synchronization signal/physical broadcast channel block (SS/PBCH block) and/or the channel state information reference signal (CSI-RS) selected by the UE and the feature parameters related to the UE.

For example, the first calculating unit 401 may calculate the transmission power according to the power offset set by the first parameter, the pathloss and the preamble receiving target power obtained based on the power ramping counter; or, the first calculating unit 401 may calculate the transmission power according to the preamble receiving target power obtained based on the power offset set by the first parameter and the power ramping counter and the pathloss.

In an embodiment, the first parameter may include: the number of sequences (N_seq.beam) received by individual receiving beams of the UE, and/or the number of sequences and the number of receiving beams contained in a preamble, and/or a configuration parameter or a subcarrier spacing employed by the preamble, and/or a type of the UE, and/or gains of transmission/receiving beams of the UE.

In an embodiment, an effect of the first parameter on the transmission power may be taken into account under a predetermined condition. For example, when the preamble is a short sequence (127/139), the effect of the first parameter on the transmission power is taken into account, and when the preamble is a long sequence (839), the effect of the first parameter on the transmission power is not taken into account.

In an embodiment, reference may be made to description in Embodiment 2 for calculating the power offset based on the first parameter and calculating the transmission power, which shall not be described herein any further.

According to the random access power control apparatus of the embodiment, random access procedures of the UE in such complex scenarios as multiple beams may be adapted for. In the case where the UE selects a new SS/PBCH block, the power ramping counter PRC and the power ramping step are set, thereby controlling the transmission power of the preamble, and avoiding influence to other UE. And the UE will select a new SS/PBCH block to transmit the preamble only when the predetermined condition is satisfied, thereby avoiding ping-ponging effects between the SS/PBCH blocks.

Embodiment 4

Embodiment 4 provides a random access power control apparatus. As a principle of the apparatus for solving problems is similar to those of the methods in Embodiment 2, the implementations of the method in Embodiment 2 may be referred to for implementation of the apparatus, with identical contents being not going be described herein any further.

Figure 5:
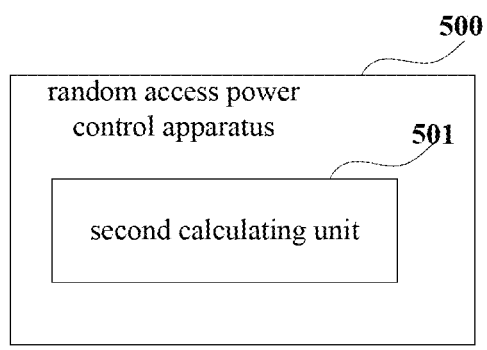
FIG. 5 is a schematic diagram of the random access power control apparatus of Embodiment 4 of this disclosure.

FIG. 5 is a schematic diagram of the random access power control apparatus. As shown in FIG. 5, a random access power control apparatus 500 includes a second calculating unit 501 configured to calculate transmission power used by UE in transmitting a preamble in a random access procedure.

In an embodiment, the second calculating unit 501 may calculate the transmission power according to a first parameter related to the UE; wherein, the first parameter includes the number of sequences (N_seq.beam) received by an individual receiving beam of the UE, and/or a configuration parameter or subcarrier spacing adopted by the preamble, and/or a type of the UE, and/or gains of transmission/receiving beams of the UE.

In an embodiment, reference may be made to description in Embodiment 2 for calculating the power offset based on the first parameter and calculating the transmission power, which shall not be described herein any further.

According to the random access power control apparatus of this embodiment, random access procedures of the UE in such complex scenarios as multiple beams may be adapted for.

Embodiment 5

Embodiment 5 provides UE, configured with the random access power control apparatus 400 describe in Embodiment 3 or the random access power control apparatus 500 describe in Embodiment 4.

Figure 6:
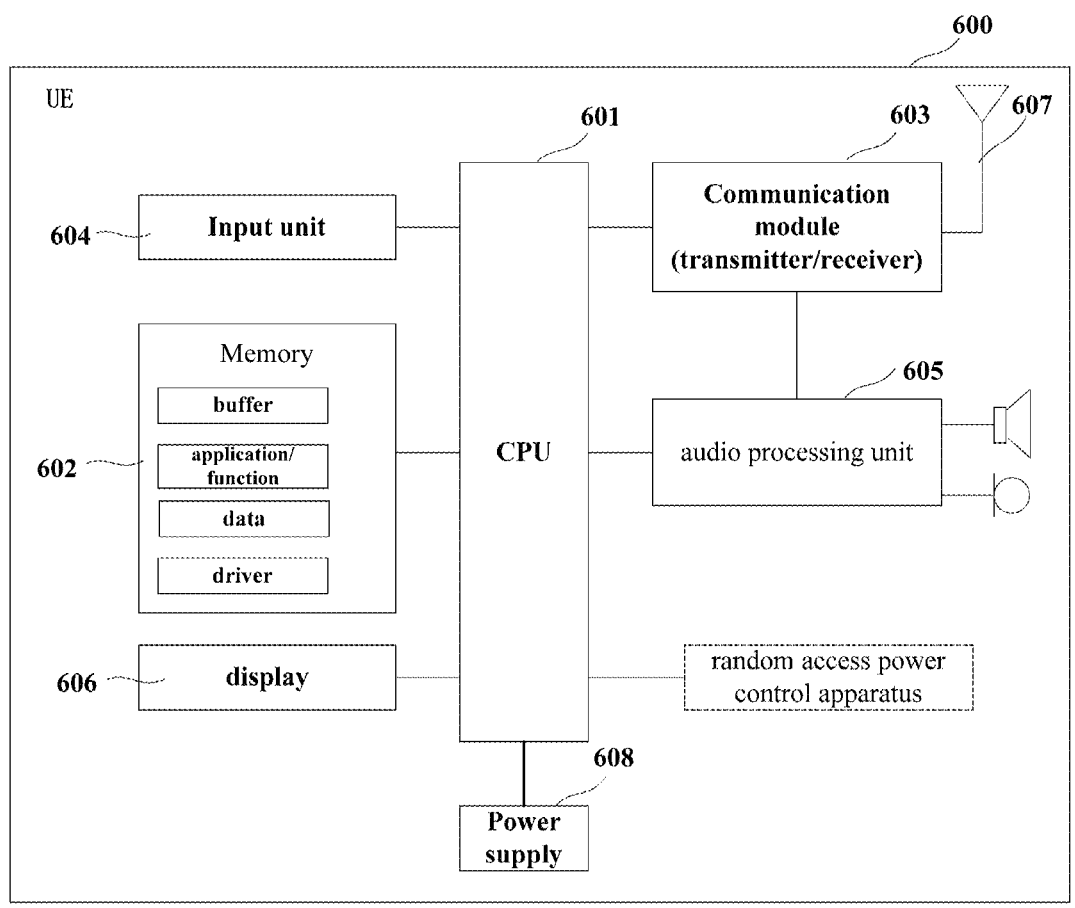
FIG. 6 is a schematic diagram of the UE of Embodiment 5 of this disclosure.

FIG. 6 is a schematic diagram of a structure of the UE of the embodiment of this disclosure. As shown in FIG. 6, UE 600 may include a central processing unit 601 and a memory 602, the memory 602 being coupled to the central processing unit 601. For example, the memory 602 may store various data, and furthermore, it may store a program for information processing, and execute the program under control of the central processing unit 601, so as to perform random access.

In one implementation, the functions of the random access power control apparatus 400 or the random access power control apparatus 500 may be integrated into the central processing unit 601. For example, the central processing unit 601 may be configured to carry out the random access method described in Embodiment 1 or Embodiment 2.

For example, the central processing unit 601 may be configured to, by using a pathloss estimated based on an synchronization signal/physical broadcast channel block (SS/PBCH block) and/or a channel state information reference signal currently selected by UE, calculate transmission power used by the UE in transmitting random access preambles. Or, the central processing unit 601 may be configured to calculate the transmission power by using the first parameter.

Furthermore, reference may be made to Embodiment 1 and Embodiment 2 for other configuration manners of the central processing unit 601, which shall not be described herein any further.

In another implementation, the random access power control apparatus 400 or the random access power control apparatus 500 and the central processing unit 601 may be configured separately. For example, the random access power control apparatus 400 or the random access power control apparatus 500 may be configured as a chip connected to the central processing unit 601, such as the random access unit shown in FIG. 6, with its functions being realized under control of the central processing unit 601.

As shown in FIG. 6, the UE 600 may further include a communication module 603, an input unit 604, a display 606, an audio processing unit 605, an antenna 607 and a power supply 608, etc., functions of which being similar to those in the related art, which shall not be described herein any further. It should be noted that the UE 600 does not necessarily include all the parts shown in FIG. 6, and furthermore, the UE 600 may include parts not shown in FIG. 6, and the related art may be referred to.

It can be seen from the above embodiment that the UE may be adapted for random access procedures of the UE in such complex scenarios as multiple beams.

Embodiment 6

Figure 7A:
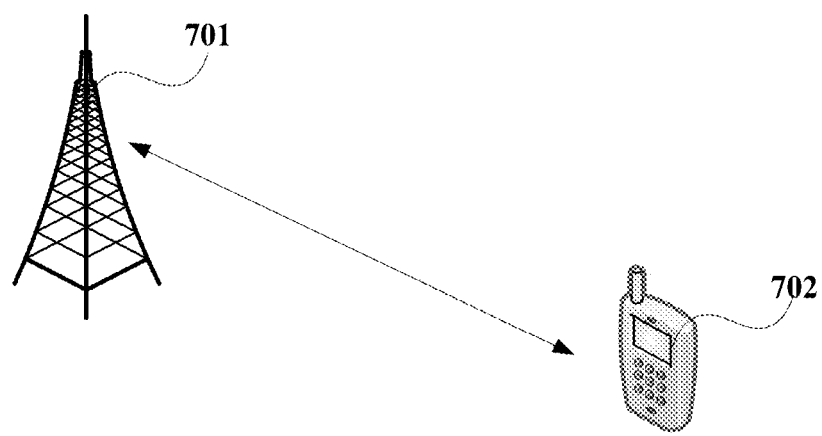
FIG. 7A is a schematic diagram of the communication system of Embodiment 6 of this disclosure.
Figure 7B:
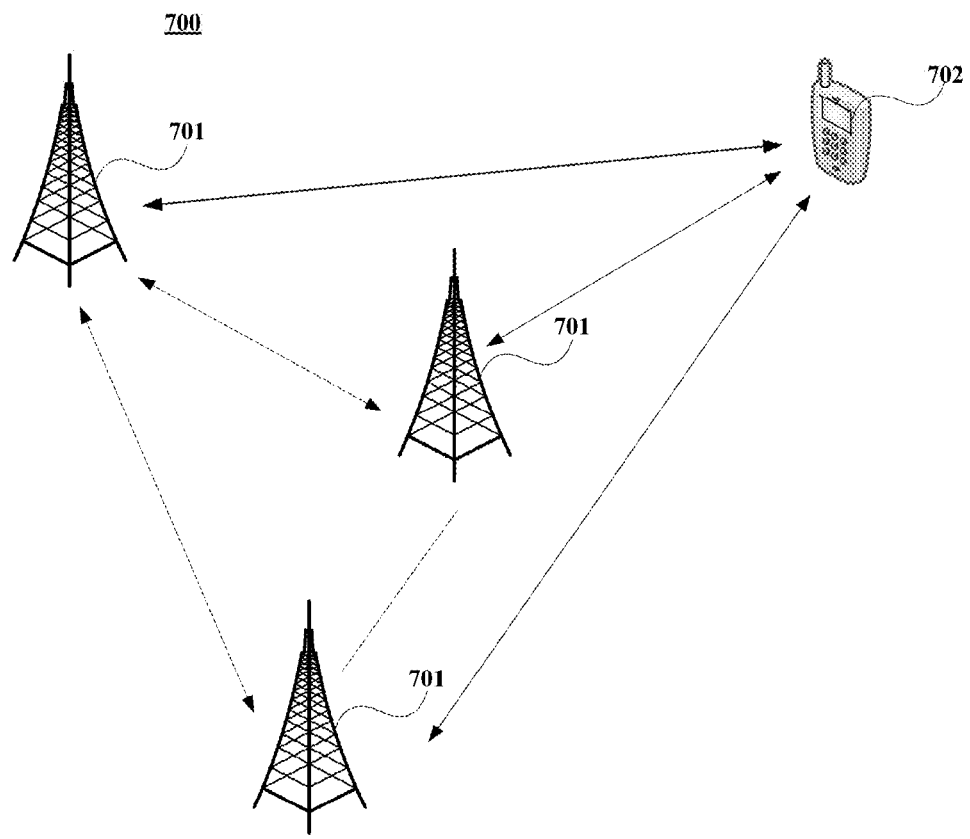
FIG. 7B is another schematic diagram of the communication system of Embodiment 6 of this disclosure.

FIGS. 7A and 7B are schematic diagrams of the communication system of Embodiment 6. As shown in FIG. 7A, the communication system 700 includes a network device 701 at a network side and UE 702. The UE 702, by using a pathloss estimated based on an synchronization signal/physical broadcast channel block (SS/PBCH block) and/or a channel state information reference signal (CSI-RS) currently selected by UE, calculates transmission power used by the UE in transmitting random access preambles, or the UE calculates the transmission power by using the first parameter. The network device 701 at a network side receives the preambles transmitted by the UE 702. Furthermore, the network device 701 at a network side may further configure any one or two or more of the above first to eighth thresholds used by the UE 702.

As shown in FIG. 7B, the communication system 700 includes multiple network devices 701 at a network side and UE 702. The UE 702, by using a pathloss estimated based on an synchronization signal/physical broadcast channel block (SS/PBCH block) and/or a channel state information reference signal (CSI-RS) currently selected by UE, calculates transmission power used by the UE in transmitting random access preambles, or the UE calculates the transmission power by using the first parameter. The multiple network devices 701 at a network side receive the preambles transmitted by the UE 702. Furthermore, the multiple network devices 701 at a network side may further configure any one or two or more of the above first to eighth thresholds used by the UE 702.

In an embodiment, a structure of the UE 702 is as described in Embodiment 5, and a workflow of the system is as described in embodiments 1-4, the contents of which being incorporated herein, which shall not be described herein any further.

It can be seen from the above embodiment that the system may be adapted for random access procedures of the UE in such complex scenarios as multiple beams.

Embodiment 7

Embodiment 7 of this disclosure provides an information indication method, applicable to a network side, such as a network device.

Figure 8:
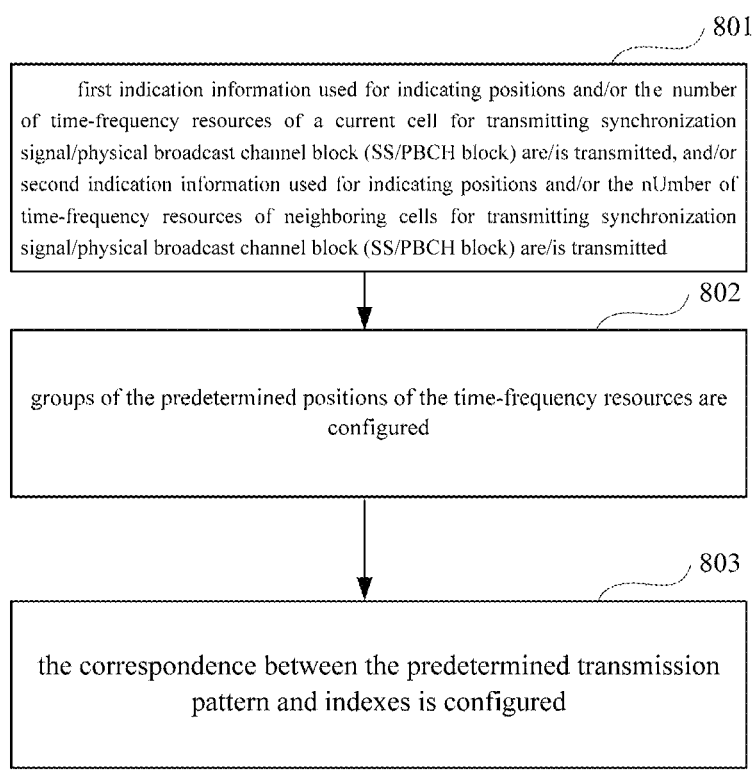
FIG. 8 is a flowchart of the information indication method of Embodiment 7 of this disclosure.

FIG. 8 is a flowchart of the information indication method of an embodiment. As shown in FIG. 8, the information indication method may include:

block 801: first indication information used for indicating positions and/or the number of time-frequency resources of a current cell for transmitting an synchronization signal/physical broadcast channel block (SS/PBCH block) are/is transmitted, and/or second indication information used for indicating positions and/or the number of time-frequency resources of neighboring cells for transmitting synchronization signal/physical broadcast channel blocks (SS/PBCH blocks) are/is transmitted.

In an embodiment, the time-frequency resources used in transmitting the SS/PBCH block may be indicated by transmitting the first indication information and/or the second indication information, which facilitates UE in performing data transmission/reception and measurement.

In an embodiment, for different frequency ranges, an upper limit of the number of the time-frequency resources used for transmitting the SS/PBCH block corresponding to a transmission period of a SS/PBCH block or synchronization resource set (SS burst set), and positions of all possible time-frequency resources used for transmitting SS/PBCH blocks at different upper limits of the number, may be predefined. For example:

frequencies less than 3 GHz, L=4;
frequencies between 3 GHz and 6 GHz, L=8; and
frequencies between 6 GHz and 52.6 GHz, L=64.

On the basis of the upper limit and positions of the number of the time-frequency resources, the network device may configure the number of time-frequency resources actually used for transmitting SS/PBCH blocks and a position of each time-frequency resource within a period of an SS/PBCH block.

In an embodiment, by transmitting the first indication information and/or the second indication information, the network device may indicate the time-frequency resources used in transmitting SS/PBCH blocks, which facilitates UE in performing data transmission/reception and measurement.

In an embodiment, the first indication information and/or the second indication information may be any one of the following:

1. Information indicating whether the predetermined positions in the time-frequency resources are used for transmitting synchronization signals/physical broadcast channel blocks.

In an embodiment, the information indicating whether the predetermined positions in the time-frequency resources are used for transmitting synchronization signals/physical broadcast channel blocks may be bits, and the predetermined positions may be, for example, positions of time-frequency resources possibly used for transmitting SS/PBCH blocks preconfigured by the network device.

In an embodiment, the first indication information and/or the second indication information may indicate based on bitmaps. For example, for each predetermined position, whether a time-frequency resource at this position is used for actually transmitting SS/PBCH blocks may be indicated by one bit; for example, the bit being 1 indicates that the time-frequency resource at this position is actually used for transmitting SS/PBCH blocks, and the bit being 0 indicates that the time-frequency resource at this position is not actually used for transmitting SS/PBCH blocks.

2. Information indicating whether groups of the predetermined positions in the time-frequency resources are used for transmitting synchronization signals/physical broadcast channel blocks.

In an embodiment, the first indication information and/or the second indication information may indicate based on bitmaps of the groups. For example, a predetermined number (such as 2) of predetermined positions in a slot are divided into a group, and for each group, whether there exist time-frequency resources actually used for transmitting SS/PBCH blocks in time-frequency resources in the group may be indicated by one bit; for example, the bit being 1 indicates that there exists at least one time-frequency resource actually used for transmitting SS/PBCH blocks in the group, and the bit being 0 indicates that there exists no time-frequency resource actually used for transmitting SS/PBCH blocks in the group. In an embodiment, when an upper limit of the number of the predetermined positions is 4 (if the number of the predetermined positions in each group is 2), information of two bits may be used to indicate whether there exist time-frequency resources actually used for transmitting SS/PBCH blocks in each group.

3. Index corresponding to a predetermined transmission pattern.

In an embodiment, a predetermined transmission pattern formed by time-frequency resources used for transmitting SS/PBCH blocks may be predefined, and a correspondence between the predetermined transmission pattern and indices may be set. Hence, in a case where the first indication information and/or the second indication information contain(s) indices, the UE may determine a transmission pattern according to an index, thereby determining the number and/or positions of the time-frequency resources actually used for transmitting SS/PBCH blocks.

In an embodiment, the predetermined transmission pattern may be, for example, transmitting SS/PBCH blocks by using a former one possible resource position in a slot only.

4. A last position in the time-frequency resources used for transmitting synchronization signal/physical broadcast channel blocks and/or a total number of positions in the time-frequency resources used for transmitting synchronization signal/physical broadcast channel blocks.

For example, the first indication information and/or the second indication information may include a total number of time-frequency resources used for transmitting SS/PBCH blocks corresponding to a transmission period of SS/PBCH blocks, and/or a position of a last time-frequency resource. At this moment, SS/PBCH blocks are continuously transmitted starting from a first position of predetermined time-frequency resources by default, until the total number of transmissions or the terminal of the time-frequency resources is reached.

5. A first position used for transmitting synchronization signal/physical broadcast channel blocks and a last position used for transmitting synchronization signal/physical broadcast channel blocks in the time-frequency resources and/or a total number of positions used for transmitting synchronization signal/physical broadcast channel blocks in the time-frequency resources.

For example, the first indication information and/or the second indication information may include a first position of the time-frequency resources used for transmitting SS/PBCH blocks corresponding to a transmission period of SS/PBCH blocks and a last position of the time-frequency resources used for transmitting SS/PBCH blocks and/or a total number of the time-frequency resources used for transmitting SS/PBCH blocks.

In an embodiment, as shown in FIG. 8, the method may further include:

block 802: groups of the predetermined positions of the time-frequency resources are configured.

Hence, the UE may receive the configuration information, and according to the first indication information and/or the second indication information, determine a group in which resources are used for transmitting SS/PBCH blocks.

In an embodiment, as shown in FIG. 8, the method may further include:

block 803: the correspondence between the predetermined transmission pattern and indexes is configured.

Hence, the UE may receive the configuration information, and according to the first indication information and/or the second indication information, determine a transmission pattern for transmitting SS/PBCH blocks.

In an embodiment, the network device may transmit the first indication information via system information (SI) and/or radio resource control (RRC) signaling; wherein, the SI may include, for example, a physical broadcast channel (PBCH), and/or remaining minimum system information (RMSI), and/or other information.

In an embodiment, the network device may transmit the second indication information via measurement configuration information, and/or redirection configuration information, and/or a handover command.

In an embodiment, the network device may configure the number of time-frequency resources actually used for transmitting SS/PBCH blocks in the transmission period of SS/PBCH blocks and a position of each time-frequency resource, and generate the first indication information according to a result of configuration.

In an embodiment, a network device of neighboring cells may transmit first indication information generated based on a result of configuration of the network device of the neighboring cells, and when a network device of the current serving cell receives the first indication information transmitted by the network device of the neighboring cells, it may process the first indication information, so as to generate the second indication information.

For example, in an embodiment, the network device of the current serving cell may, based on the first indication information transmitted by the neighboring cells, determine time-frequency resources of the neighboring cells actually used for transmitting SS/PBCH blocks, determine a measurement window of the UE according to the determined time-frequency resources, and generate the second indication information by using the measurement window.

Hence, the second indication information may indicate only configurations of time-frequency resources of the neighboring cells used for transmitting SS/PBCH blocks within the measurement window; wherein, it is possible that the measurement window is unable to cover positions of all possible time-frequency resources of the neighboring cells used for transmitting SS/PBCH blocks.

In an embodiment, based on the second indication information, the UE may obtain the configurations of time-frequency resources of the neighboring cells used for transmitting SS/PBCH blocks.

According to an embodiment, the UE may be facilitated in performing data transmission/reception and measurement.

Embodiment 8

Embodiment 8 of this disclosure provides an information indication method, applicable to a UE side, such as UE.

Figure 9:
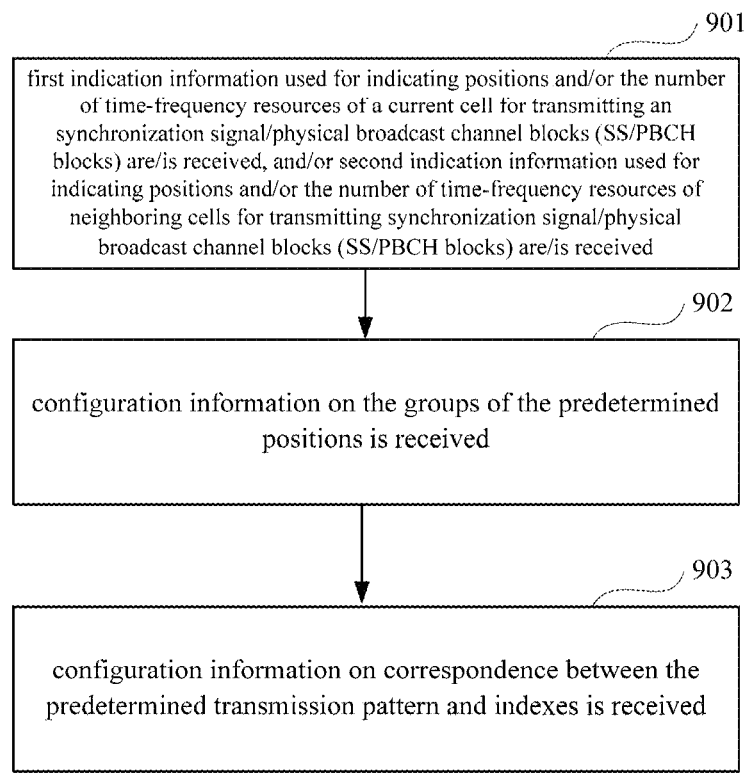
FIG. 9 is a flowchart of the information indication method of Embodiment 8 of this disclosure.

FIG. 9 is a flowchart of the information indication method of an embodiment. As shown in FIG. 9, the information indication method may include:

block 901: first indication information used for indicating positions and/or the number of time-frequency resources of a current cell for transmitting an synchronization signal/physical broadcast channel block (SS/PBCH block) are/is received, and/or second indication information used for indicating positions and/or the number of time-frequency resources of neighboring cells for transmitting synchronization signal/physical broadcast channel blocks (SS/PBCH blocks) are/is received.

In an embodiment, by receiving the first indication information and/or the second indication information, the time-frequency resources used in transmitting SS/PBCH blocks may be indicated, which facilitates UE in performing data transmission/reception and measurement.

In an embodiment, reference may be made to Embodiment 7 for explanation of the first indication information and/or the second indication information.

In an embodiment, as shown in FIG. 9, the information indication method may further include:

block 902: configuration information on the groups of the predetermined positions is received.

Hence, the UE may receive the configuration information, and according to the first indication information and/or the second indication information, determine a group in which resources are used for transmitting SS/PBCH blocks.

In an embodiment, as shown in FIG. 9, the information indication method may further include:

block 903: configuration information on correspondence between the predetermined transmission pattern and indexes is received.

Hence, the UE may receive the configuration information, and according to the first indication information and/or the second indication information, determine a transmission pattern for transmitting SS/PBCH blocks.

In an embodiment, the UE may the first indication information via system information (SI) and/or radio resource control (RRC) signaling.

In an embodiment, the UE may receive the second indication information via measurement configuration information, and/or redirection configuration information, and/or a handover command.

According to this embodiment, the UE may be facilitated in performing data transmission/reception and measurement.

Embodiment 9

Embodiment 8 of this disclosure provides an information indication apparatus, configured in a transmitter end. This embodiment corresponds to the information method of Embodiment 9, with identical contents being not going to be described herein any further.

Figure 10:
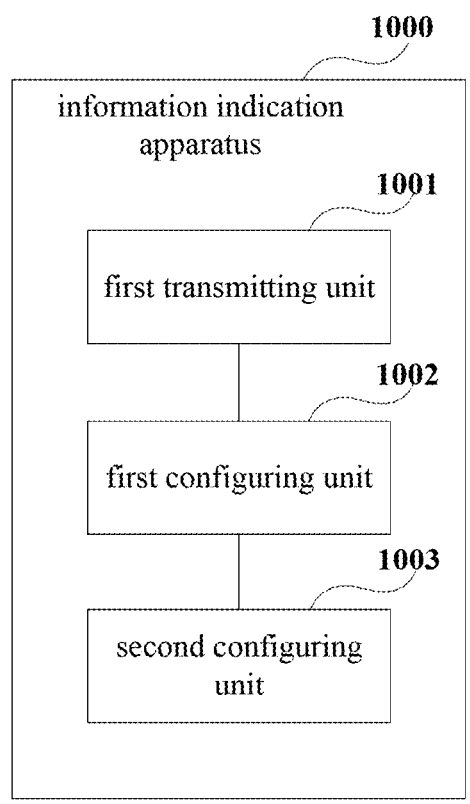
FIG. 10 is a schematic diagram of the information indication apparatus of Embodiment 9 of this disclosure.

FIG. 10 is a schematic diagram of the information indication apparatus of the embodiment of this disclosure. As shown in FIG. 10, an information indication apparatus 1000 includes:

a first transmitting unit 1001 configured to transmit first indication information used for indicating positions and/or the number of time-frequency resources of a current cell for transmitting an synchronization signal/physical broadcast channel block (SS/PBCH block), and/or second indication information used for indicating positions and/or the number of time-frequency resources of neighboring cells for transmitting synchronization signal/physical broadcast channel blocks (SS/PBCH blocks).

In an embodiment, the first transmitting unit 1001 may transmit the first indication information via system information (SI) and/or radio resource control (RRC) signaling.

In an embodiment, the first transmitting unit 1001 may transmit the second indication information via measurement configuration information, and/or redirection configuration information, and/or a handover command.

In an embodiment, reference may be made to Embodiment 7 for explanation of the first indication information and/or the second indication information.

In an embodiment, as shown in FIG. 10, the information indication apparatus 1000 may further include a first configuring unit 1002 configured to configure groups of predetermined positions.

As shown in FIG. 10, the information indication apparatus 1000 may further include a second configuring unit 1003 configured to configure a correspondence between the predetermined transmission pattern and indexes.

In an embodiment, the apparatus 1000 may configure the number of time-frequency resources actually used for transmitting SS/PBCH blocks in the transmission period of SS/PBCH blocks and a position of each time-frequency resource, and generate the first indication information according to a result of configuration.

In an embodiment, a network device of neighboring cells may transmit first indication information generated based on a result of configuration of the network device of the neighboring cells, and when a network device of a current serving cell receives the first indication information transmitted by the network device of the neighboring cells, it may process the first indication information, so as to generate the second indication information. Hence, the apparatus 1000 of this disclosure may further include an indication information generating portion (not shown), and reference may be made to Embodiment 7 for a method for generating the second indication information by the indication information generating portion.

Based on the second indication information, the UE may obtain configuration of time-frequency resources of the neighboring cell used for transmitting SS/PBCH blocks.

According to this embodiment, the UE may be facilitated in performing data transmission/reception and measurement.

Embodiment 10

The embodiment of this disclosure provides an information indication apparatus, configured in a receiver end. This embodiment corresponds to the information method of Embodiment 8, with identical contents being not going to be described herein any further.

Figure 11:
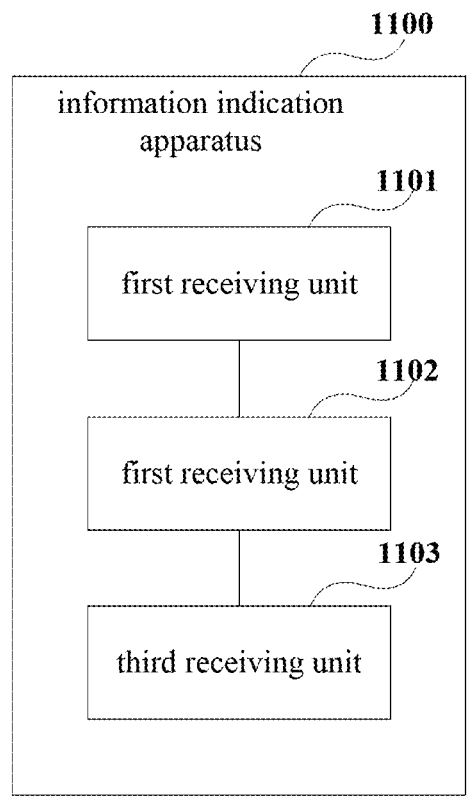
FIG. 11 is a schematic diagram of the information indication apparatus of Embodiment 10 of this disclosure.

FIG. 11 is a schematic diagram of the information indication apparatus of the embodiment of this disclosure. As shown in FIG. 11, an information indication apparatus 1100 includes:

a first receiving unit 1101 configured to receive first indication information used for indicating positions and/or the number of time-frequency resources of a current cell for transmitting an synchronization signal/physical broadcast channel block (SS/PBCH block), and/or second indication information used for indicating positions and/or the number of time-frequency resources of neighboring cells for transmitting synchronization signal/physical broadcast channel blocks (SS/PBCH blocks).

In an embodiment, the first receiving unit 1101 may receive the first indication information via system information (SI) and/or radio resource control (RRC) signaling.

In an embodiment, the first receiving unit 1101 may receive the second indication information via measurement configuration information, and/or redirection configuration information, and/or a handover command.

In an embodiment, as shown in FIG. 11, the information indication apparatus 1100 may further include a second receiving unit 1102 configured to receive configuration information on groups of predetermined positions.

As shown in FIG. 11, the apparatus 1100 may further include a third receiving unit 1103 configured to receive configuration information on a correspondence between the predetermined transmission pattern and indexes.

According to an embodiment, the UE may be facilitated in performing data transmission/reception and measurement.

Embodiment 11

The embodiment of this disclosure provides a communication system, with contents identical to those in embodiments 7-10 being not going to be described herein any further.

In an embodiment, the communication system may include:

a transmitter end configured with the information indication apparatus 1000 described in Embodiment 9; and a receiver end configured with the information indication apparatus 1100 described in Embodiment 10.

Figure 12:
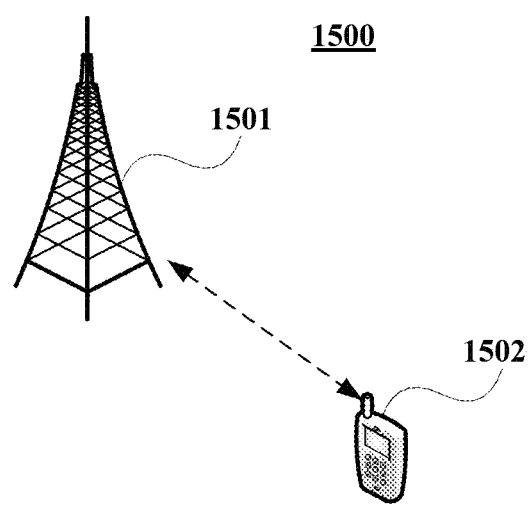
FIG. 12 is a schematic diagram of the communication system of Embodiment 11 of this disclosure.

FIG. 12 is a schematic diagram of the communication system of the embodiment of this disclosure, in which a case where the transmitter end is UE and the receiver end is a base station is shown. As shown in FIG. 12, the communication system 1200 may include a base station 1201 and UE 1202, the base station 1201 being configured with the information indication apparatus 1000 described in Embodiment 9, and the UE 1202 being configured with the information indication apparatus 1100 described in Embodiment 10.

The embodiment of this disclosure further provides a receiver end, such as a base station; however, this disclosure is not limited thereto, and it may also be other network devices. Following description shall be given by taking a base station as an example.

Figure 13:
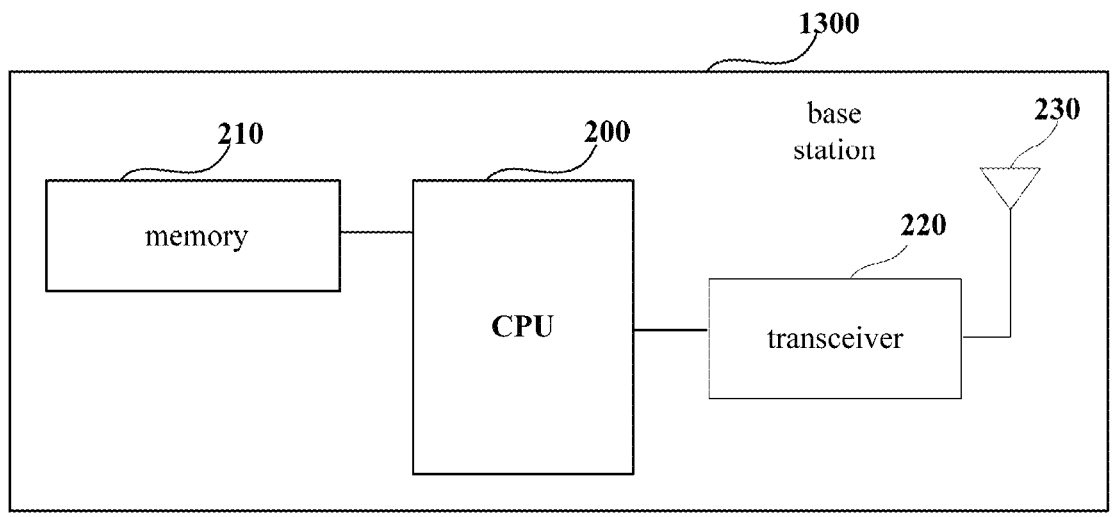
FIG. 13 is a schematic diagram of the base station of Embodiment 11 of this disclosure.

FIG. 13 is a schematic diagram of a structure of the base station of the embodiment of this disclosure. As shown in FIG. 13, a base station 1300 may include a central processing unit (CPU) 200 and a memory 210, the memory 210 being coupled to the central processing unit 200. For example, the memory 210 may store various data, and furthermore, it may store a program for information processing, and execute the program under control of the central processing unit 200.

In an embodiment, the central processing unit 200 may be configured to carry out the functions of the information indication apparatus 1000.

For example, the central processing unit 200 may be configured to perform control, so that the base station carries out the information indication method described in Embodiment 7.

Furthermore, as shown in FIG. 13, the base station 1300 may include a transceiver 220, and an antenna 230, etc. For example, functions of the above components are similar to those in the related art, and shall not be described herein any further. It should be noted that the base station 1300 does not necessarily include all the parts shown in FIG. 13, and furthermore, the base station 1300 may include parts not shown in FIG. 13, and the related art may be referred to.

The embodiment of this disclosure further provides a transmitter end, such as UE; however, this disclosure is not limited thereto, and it may also be other network devices. Following description shall be given by taking UE as an example.

Figure 14:
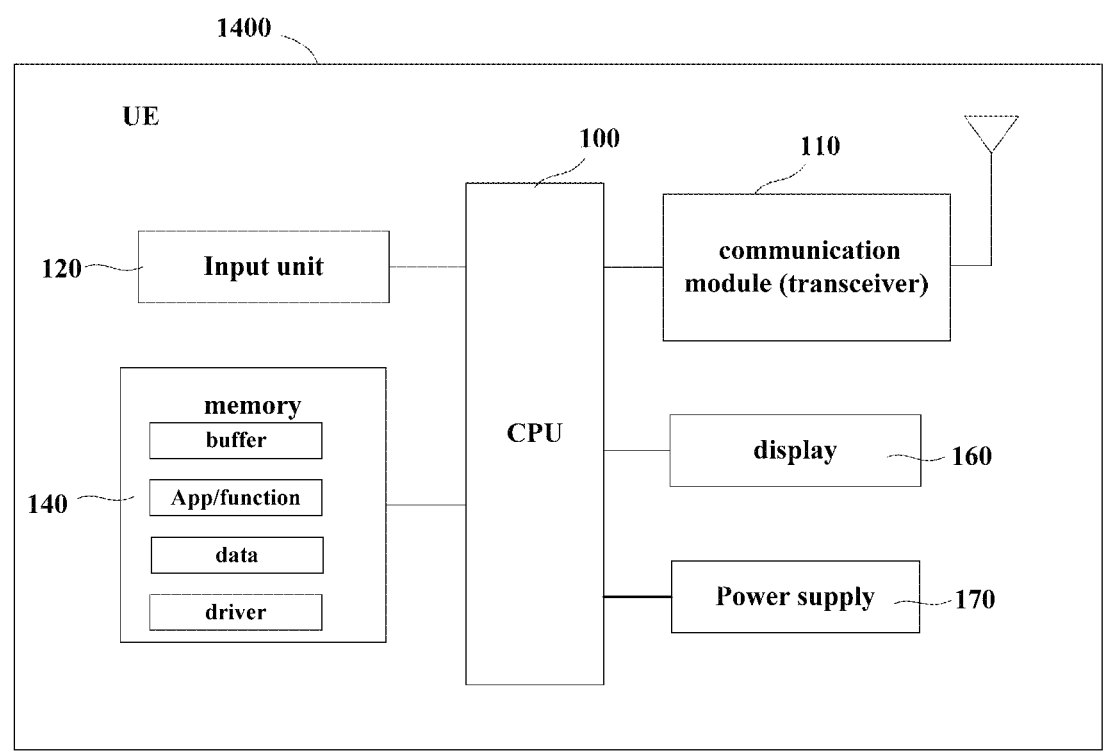
FIG. 14 is a schematic diagram of the UE of Embodiment 11 of this disclosure.

FIG. 14 is a schematic diagram of the UE of the embodiment of this disclosure. As shown in FIG. 14, UE 1400 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions.

In an embodiment, the central processing unit 100 may be configured to carry out the functions of the information indication apparatus 1100.

For example, the central processing unit 100 may be configured to perform control, so that the UE carries out the information indication method described in Embodiment 8.

As shown in FIG. 14, the UE 1400 may further include a communication module 110, an input unit 120, a display 160 and a power supply 170. It should be noted that the UE 1400 does not necessarily include all the parts shown in FIG. 14, and furthermore, the UE 1400 may include parts not shown in FIG. 14, and the related art may be referred to.

An embodiment of the present disclosure provides a computer readable program, which, when executed in a random access power control apparatus or UE, will cause the random access power control apparatus or UE to carry out the random access power control method as described in embodiments 1 and 2.

An embodiment of the present disclosure provides a computer storage medium, including a computer readable program, which will cause a random access power control apparatus or UE to carry out the random access power control method as described in embodiments 1 and 2.

An embodiment of the present disclosure provides a computer readable program, which, when executed in an information indication apparatus or a network device, will cause the information apparatus or the network device to carry out the information indication method as described in Embodiment 7.

An embodiment of the present disclosure provides a computer storage medium, including a computer readable program, which will cause an information indication apparatus or a network device to carry out the information indication method as described in Embodiment 7.

An embodiment of the present disclosure provides a computer readable program, which, when executed in an information indication apparatus or UE, will cause the information apparatus or the UE to carry out the information indication method as described in Embodiment 8.

An embodiment of the present disclosure provides a computer storage medium, including a computer readable program, which will cause an information indication apparatus or UE to carry out the information indication method as described in Embodiment 8.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or blocks as described above.

The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIGS. 4, 5, 10 and 11 may either correspond to software modules of procedures of a computer program, or correspond to hardware modules. Such software modules may respectively correspond to the blocks shown in FIGS. 1, 2, 3, 8 and 9. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 4, 5, 10 and 11 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 4, 5, 10 and 11 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An information indication apparatus configured in a base station, including:
   a transmitter configured to transmit
      first indication information used for indicating positions of time-frequency resources of a cell, or the number of time-frequency resources of a cell for transmitting a synchronization signal, a physical broadcast channel block (SS, PBCH block), or
      second indication information used for indicating positions of time-frequency resources of neighboring cells, or the number of time-frequency resources of neighboring cells for transmitting synchronization signal, physical broadcast channel blocks (SS, PBCH blocks), wherein the transmitter transmits the first indication information via system information (SI), or dedicated radio resource control (RRC) signaling, wherein the transmitter transmits the second indication information via measurement configuration information, wherein the first indication information, or the second indication information includes:

information indicating whether the predetermined positions in the time-frequency resources are used for transmitting synchronization signals, physical broadcast channel blocks; or information indicating whether groups of the predetermined positions in the time-frequency resources are used for transmitting synchronization signals, physical broadcast channel blocks.

2. The information indication apparatus of claim 1, wherein
the transmitter is configured to transmit:
the first indication information, and
the second indication information.

3. The information indication apparatus of claim 1, wherein
the first indication information is used for indicating the positions of the time-frequency resources of the cell, and the number of the time-frequency resources of the cell.

4. The information indication apparatus of claim 1, wherein
the second indication information is used for indicating the positions of the time-frequency resources of the neighboring cells, and the number of the time-frequency resources of the neighboring cells.

5. The information indication apparatus of claim 1, wherein
the transmitter transmits the first indication information via the system information (SI), and the dedicated radio resource control (RRC) signaling.

6. An information reception apparatus configured in a user equipment, including:
a receiver configured to receive
first indication information used for indicating positions, or the number of time-frequency resources of a cell for transmitting a synchronization signal, a physical broadcast channel block (SS, PBCH block), or
second indication information used for indicating positions, or the number of time-frequency resources of neighboring cells for transmitting synchronization signal, physical broadcast channel blocks (SS, PBCH blocks),
wherein the receiver receives the first indication information via system information (SI), or dedicated radio resource control (RRC) signaling,
wherein the receiver receives the second indication information via measurement configuration information,
wherein the first indication information, or the second indication information includes:
information indicating whether the predetermined positions in the time-frequency resources are used for transmitting synchronization signals, physical broadcast channel blocks; or
information indicating whether groups of the predetermined positions in the time-frequency resources are used for transmitting synchronization signals, physical broadcast channel blocks.

* * * * *